(12) United States Patent
Zhu et al.

(10) Patent No.: US 11,963,060 B2
(45) Date of Patent: *Apr. 16, 2024

(54) WLAN TO CELLULAR HANDOVER TECHNIQUES FOR VOICE CALLS

(71) Applicant: Apple Inc., Cupertino, CA (US)

(72) Inventors: Yifan Zhu, San Jose, CA (US); Vijay Venkataraman, San Jose, CA (US); Viswanath Nagarajan, San Jose, CA (US); Sang Ho Baek, Palo Alto, CA (US); Lakshmi N. Kavuri, Cupertino, CA (US); Utkarsh Kumar, Fremont, CA (US); Krisztian Kiss, Hayward, CA (US); Shivani Suresh Babu, San Jose, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,957

(22) Filed: Oct. 4, 2022

(65) Prior Publication Data
US 2023/0023828 A1  Jan. 26, 2023

Related U.S. Application Data

(63) Continuation of application No. 17/023,173, filed on Sep. 16, 2020, now Pat. No. 11,503,527.

(60) Provisional application No. 62/909,960, filed on Oct. 3, 2019.

(51) Int. Cl.
*H04W 36/14* (2009.01)
*H04B 17/318* (2015.01)
(Continued)

(52) U.S. Cl.
CPC .......... *H04W 36/30* (2013.01); *H04B 17/318* (2015.01); *H04L 43/0829* (2013.01);
(Continued)

(58) Field of Classification Search
CPC ... H04W 36/30; H04W 36/14; H04W 84/042; H04W 84/12; H04W 36/0022;
(Continued)

(56) References Cited

U.S. PATENT DOCUMENTS

| 10,326,615 B2 | 6/2019 | Baboescu |
| 2013/0003703 A1 | 1/2013 | Todd |

(Continued)

FOREIGN PATENT DOCUMENTS

WO   2019072099   4/2019

OTHER PUBLICATIONS

Office Action for EP Patent Application No. 20199541.2; 5 pages; dated Oct. 4, 2022.
(Continued)

*Primary Examiner* — Huy C Ho
(74) *Attorney, Agent, or Firm* — Kowert, Hood, Munyon, Rankin & Goetzel, P.C.

(57) ABSTRACT

Techniques are disclosed relating to handover of WLAN voice calls to one or more cellular networks. In some embodiments, a device is configured to perform voice communications over one or more wireless local area networks, communicate with a first network using a first cellular radio access technology (RAT), and communicate with a second network using a second cellular RAT. The device may store, based on communications via the first network, information indicating that the first network does not support voice communications for the apparatus. The device may handover a voice call from a wireless local network directly to the second cellular RAT, based on the stored information and without handover of the voice call to the first cellular RAT, based on call conditions on the wireless local area network.

26 Claims, 14 Drawing Sheets

(51) Int. Cl.
*H04L 43/0829* (2022.01)
*H04L 65/1016* (2022.01)
*H04L 65/1073* (2022.01)
*H04W 36/30* (2009.01)
*H04W 84/04* (2009.01)
*H04W 84/12* (2009.01)

(52) U.S. Cl.
CPC ...... *H04L 65/1016* (2013.01); *H04L 65/1073* (2013.01); *H04W 36/14* (2013.01); *H04W 84/042* (2013.01); *H04W 84/12* (2013.01)

(58) Field of Classification Search
CPC ....... H04W 36/0066; H04W 36/00837; H04W 36/0085; H04B 17/318; H04L 43/0829; H04L 65/1016; H04L 65/1073
USPC ........................................................ 370/331
See application file for complete search history.

(56) References Cited

U.S. PATENT DOCUMENTS

| | | |
|---|---|---|
| 2015/0111571 A1 | 4/2015 | Tanikawa |
| 2015/0172986 A1* | 6/2015 | Salkintzis ............. H04W 36/36 455/436 |
| 2016/0174191 A1* | 6/2016 | Singh .................. H04W 60/005 370/329 |
| 2016/0234749 A1 | 8/2016 | Singh |
| 2017/0289862 A1 | 10/2017 | Shaheen |
| 2017/0366955 A1 | 12/2017 | Edge |
| 2018/0359663 A1 | 12/2018 | Kim |
| 2020/0008248 A1* | 1/2020 | Beck ....................... H04L 45/24 |
| 2020/0128449 A1 | 4/2020 | Faus Gregori |
| 2021/0136633 A1 | 5/2021 | Zetterlund |

OTHER PUBLICATIONS

Extended European Search Report for EP Patent Application 20199541; 13 pages; dated Feb. 22, 2021.

VIVO "Solution for how to define the UE capability ID"; SA WG2 Meeting #128bis S2-187933; Sophia Antipolis, FR; 2 pages; Oct. 20, 2018.

Oppo et al. "Discussion for returning back to NR in case of handover for voice"; SA WG2 Meeting #122bis S2-176976; Ljubljana, Solvenia; 3 pages; Oct. 23, 2017.

Ericsson et al. "Use of EPS/RAT fallback for VoWIFI session"; 3GPP TSG-SA2 Meeting #136AH S2-2001342. Incheon, KR; 3 pages; Oct. 13, 2020.

* cited by examiner

|   | 8 | 7 | 6 | 5 | 4 | 3 | 2 | 1 | |
|---|---|---|---|---|---|---|---|---|---|
| | 5GS network feature support IEI | | | | | | | | Octet 1 |
| | Length of 5GS network feature support contents | | | | | | | | Octet 2 |
| | MPSI | IWK N26 | EMF | | | EMC | IMS-VoPS-N3GPP | IMS-VoPS-3GPP | Octet 3 |
| | 5G-LCS | 5G-UP CIoT | 5G-HC-CP CIoT | N3 data | 5G-CP CIoT | Restrict EC | MCSI | EMCN | Octet 4 |
| | Spare | | | | | | | | Octet 5 |

5GS network feature support information element

*Example bits for explicit indication whether network supports VoNR* (arrows pointing to MCSI and EMCN / Restrict EC and 5G-CP CIoT area)

FIG. 7

| | | |
|---|---|---|
| 0 | 0 | VoNR not supported |
| 0 | 1 | VoNR supported in NR connected to 5GCN only |
| 1 | 0 | VoNR supported in E-UTRAN connected to 5GCN only |
| 1 | 1 | VoNR supported in both NR connected to 5GCN and E-UTRAN connected to 5GCN |

FIG. 8

WLAN TO CELLULAR HANDOVER TECHNIQUES FOR VOICE CALLS

PRIORITY INFORMATION

This application is a continuation of U.S. patent application Ser. No. 17/023,173, entitled "WLAN to Cellular Handover Techniques for Voice Calls," filed Sep. 16, 2020, claims the benefit of U.S. Provisional Application No. 62/909,960, entitled "WLAN to Cellular Handover Techniques for Voice Calls," filed on Oct. 3, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to techniques for handover of WLAN voice calls to one or more cellular networks.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

For example, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards.

Voice calls are often performed over wireless local area networks, e.g., using WiFi calling functionality. When WiFi signal deteriorates or is lost, voice calls may need to be handed over to a cellular network. For voice calls, 5G standalone networks may support voice over NR (VoNR) or may facilitate EPS fallback to one or more legacy networks.

BRIEF DESCRIPTION OF THE DRAWINGS

A better understanding of the present subject matter can be obtained when the following detailed description of various embodiments is considered in conjunction with the following drawings, in which:

FIG. 7 is a diagram illustrating an example 5GS information element that includes an explicit indication whether VoNR is supported, according to some embodiments.

FIG. 8 is a diagram illustrating an example encoding for the field of FIG. 7, according to some embodiments.

Figure 1:
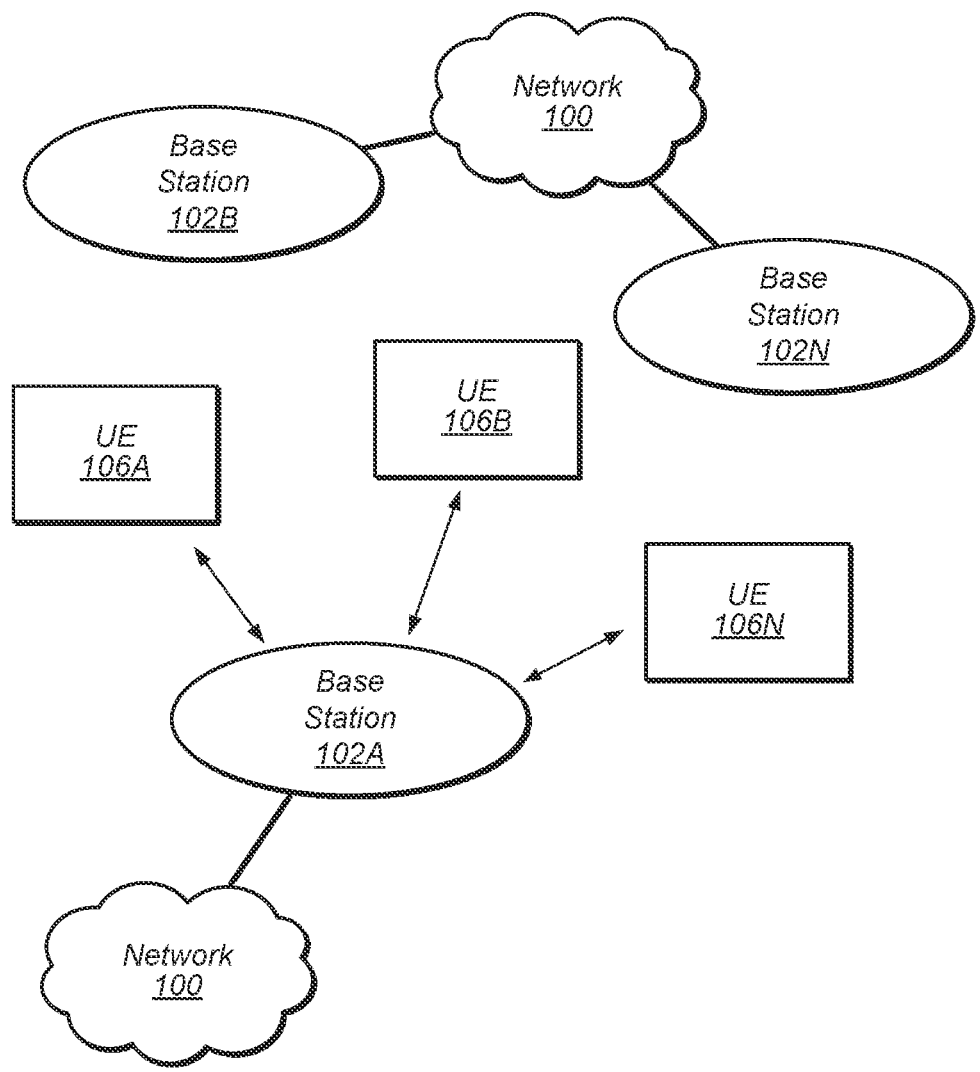
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "application processor configured to send an IP packet" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Figure 2:
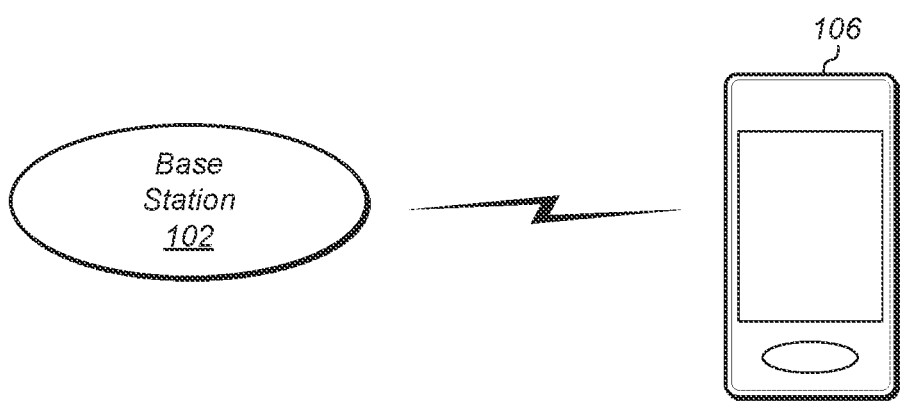
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
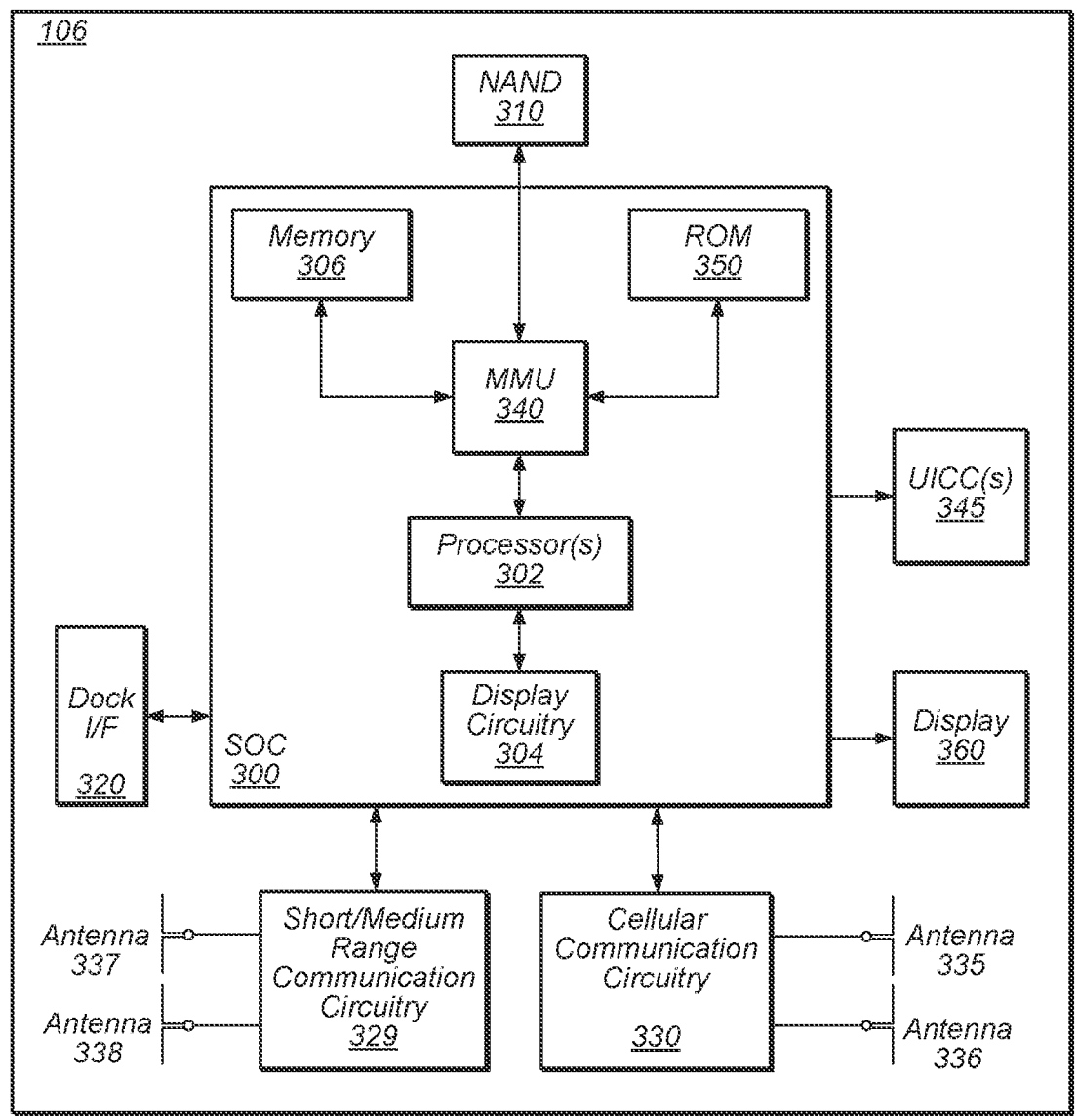
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including the communication device 106 exchanging communications with a base station to determine one or more scheduling profiles. In some embodiments, the communications with the base station to determine the one or more scheduling profiles may include exchange of one or more radio resource control (RRC) signal messages. In some embodiments, the one or more scheduling profiles may not conflict with one another. In some embodiments, a scheduling profile may specify one or more parameters associated with communication device 106 communication behavior, e.g., one or more constraints on communication device 106 communication behavior and/or slot scheduling of communication device 106 communications. In addition, the method may include the communication device 106 receiving a slot configuration schedule from the base station. The slot configuration schedule may be based on at least one scheduling profile of the one or more scheduling profiles. Further, the method may include the communication device 106 performing communications with the base station based on the at least one scheduling profile.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
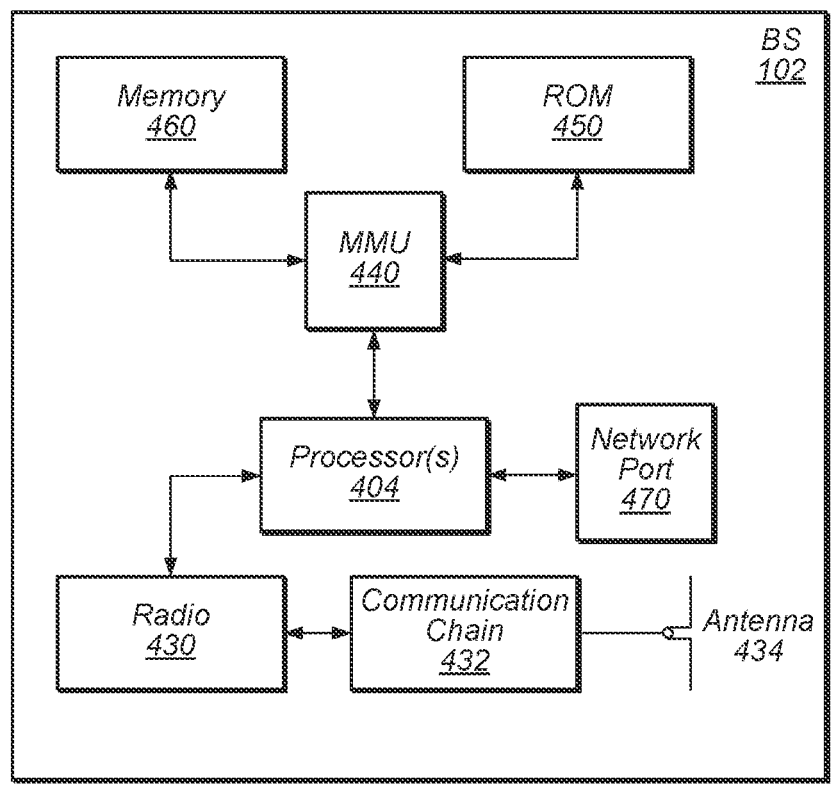
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
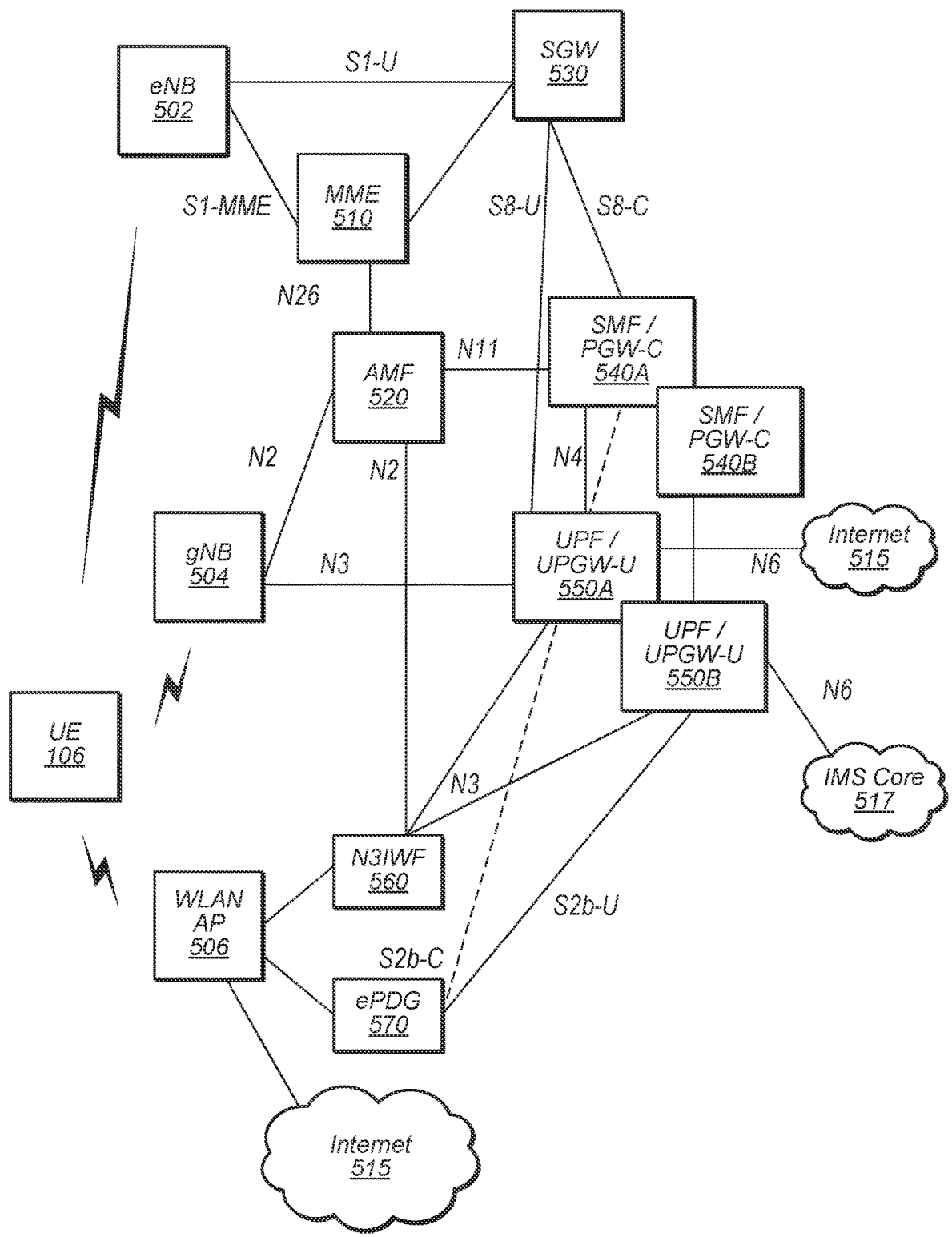
FIG. 5 is a block diagram illustrating example 5G, 4G, and WLAN connections for a UE, according to some embodiments.

FIG. 5: Block Diagram of Example Cellular Network Interfaces

FIG. 5 is a block diagram illustrating example interfaces for potential connections between a UE 106, different cellular networks (e.g., LTE and NR networks), and a wireless local area network (WLAN), according to some embodiments. In the illustrated example, UE 106 is configured to wirelessly communicate with eNB 502, gNB 504, and WLAN AP 506.

The disclosed connections may allow UE 106 to handover from a WiFi voice call via WLAN AP 506 to one of the cellular base stations, e.g., when WiFi wireless conditions deteriorate. The NR network corresponding to gNB 504 may or may not support voice over new radio (VoNR), however. Various techniques discussed below may improve handover from the WLAN network to one of multiple cellular networks supported by the UE.

eNB 502, in the illustrated embodiment, is configured to provide connectivity to the internet 515 or IMS core network 517 via one or more of mobility management entity (MME) 510, access and mobility management function (AMF) 520, service gateway (SGW) 530, session management function (SMF)/packet gateway control (PGW-C) elements 540A-540B, and user plane function (UPF)/user plane gateway (UPGW-U) elements 550A-550B.

gNB 504, in the illustrated embodiment, is configured to provide connectivity to the internet 515 or IMS core network 517 via one or more of AMF 520, session management function (SMF)/packet gateway control (PGW-C) elements 540A-540B, and user plane function (UPF)/user plane gateway (UPGW-U) elements 550A-550B.

WLAN AP 506, in the illustrated embodiment, is configured to provide connectivity to the internet and is also configured to provide connectivity to IMS core network 517 via one or more of evolved packet data gateway (ePDG) 570, non-3GPP interworking function (N3IWF), and user plane function (UPF)/user plane gateway (UPGW-U) elements 550A-550B.

Note that the AMF 520 and SMF/PGW-C elements may communicate with one or more elements that implement one or more of the following functions: NSSF, SMSF, AF, UDM, PCF, and AUSF.

The disclosed connectivity of FIG. 5 is included for purposes of illustration of one example configuration, but is not intended to limit the scope of the present disclosure. Disclosed techniques may be used in various network configurations.

Example of Handover Delay

Figure 6:
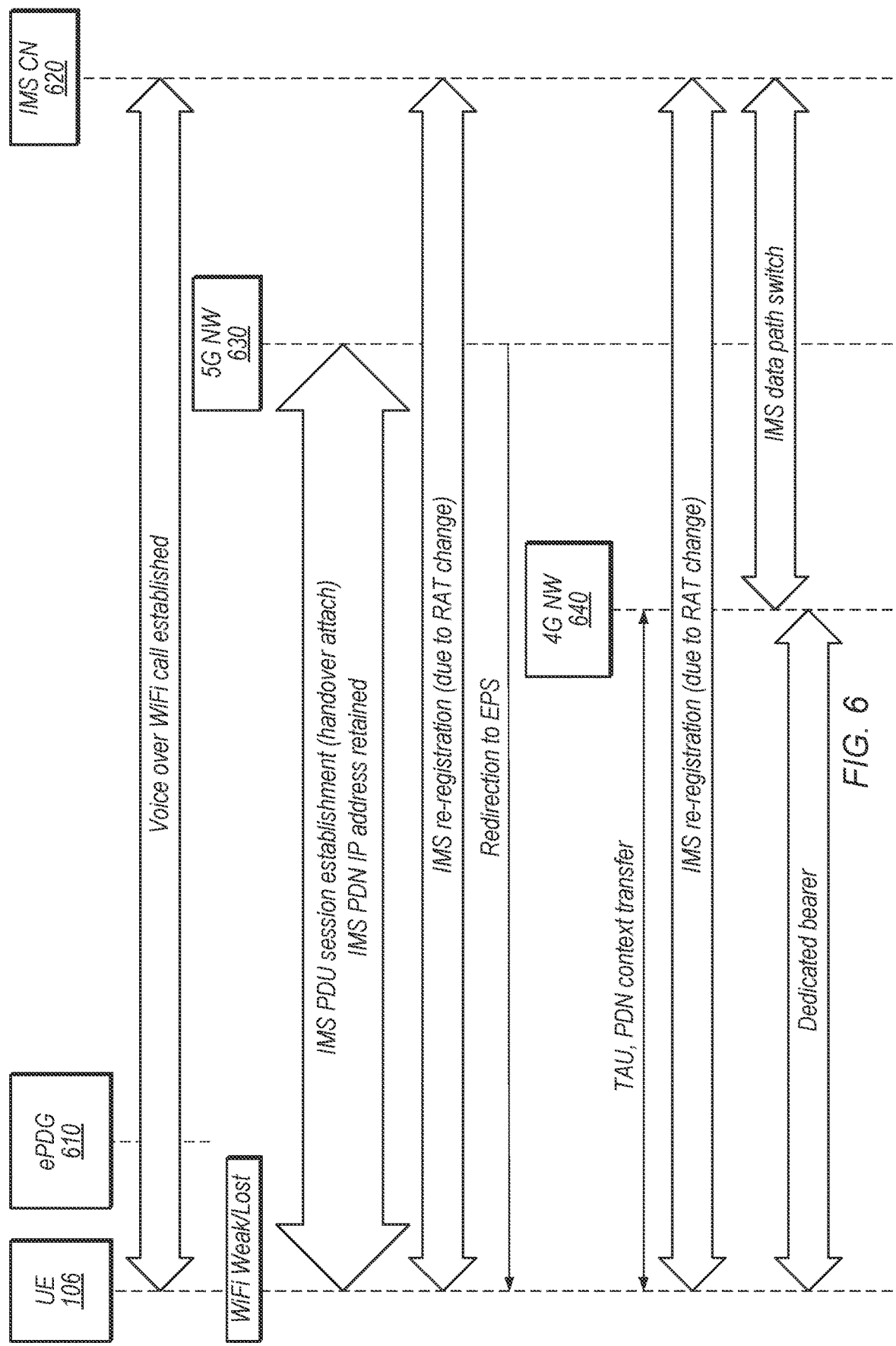
FIG. 6 is a communication diagram illustrating delay in handover from a WiFi call when a 5G network does not support VoNR, according to some embodiments.

FIG. 6 is a communication diagram illustrating an example handover of a WiFi voice call to a cellular network, according to some embodiments. In the illustrated examples, communications are shown between a UE 106, ePDG 610, IP multimedia subsystem (IMS) core network (CN) 620, a 5G network 630, and a 4G network 640.

In the illustrated example, UE 106 establishes a WiFi call via ePDG 610 and IMS CN 620. Subsequently, the WiFi connection is weak or is lost and UE 106 performs IMS PDU session establishment on the 5G network, with the IMS PDN IP address retained for the call. The UE then performs IMS re-registration due to the radio access technology (RAT) change. In this example, however, the 5G network 630 does not support VoNR and redirects UE 106 to the evolved packet system (EPS). UE 106 then transfers the tracking area update (TAU) and packet data network (PDN) context to 4G NW 640, performs IMS re-registration due to the RAT change, and is assigned a dedicated bearer after an IMS data path switch.

As shown, the handover to 5G then to 4G may cause delay in situations where the 5G network does not support VoNR and uses EPS fallback or RAT fallback instead. Traditional networks do not provide an explicit indication of whether the 5G network supports VoNR. Rather, a traditional network may simply indicate whether the network has support for IMS voice of PS (VoPS) such that it is not clear to the UE whether voice service on 5G networks is provided via VoNR or VoLTE (EPS fallback or RAT fallback), for example. Further, if a user disables 4G connectivity, the UE 106 may not know whether to stay camped on a 5G connection during a voice call (which is appropriate if VoNR radio is supported) or to move to another RAT (e.g., a 2G or 3G RAT, which is appropriate if the 5G network relies on EPS fallback or RAT fallback).

In disclosed embodiments discussed in detail below, the 5G network explicitly indicates whether it supports VoNR or the UE implements techniques to remember the capabilities of a 5G network. Note that various techniques discussed herein with reference to voice calls may also be used for other types of communications with real-time requirements, such as video communications, for example.

Example Explicit Indication for VoNR Support

FIG. 7 is a diagram illustrating an example 5GS network feature support information element, according to some embodiments. As discussed in 3GPP TS 24.501 with reference to FIG. 9.11.3.5, the illustrated information may be included in a REGISTRATION ACCEPT information element generated by the AMF and transmitted from a gNB to a UE. In the illustrated embodiment, spare bits 3 and 4 in octet 5 are used to transmit VoNR support information. Note that these bits are suggested for purposes of illustration but are not intended to limit the scope of the present disclosure. In other embodiments, other fields of the illustrated message or other types of messages may be used to transmit similar information using any of various appropriate encodings.

FIG. 8 is a table illustrating example encodings for VoNR support, according to some embodiments. In the illustrated embodiments, two bits are used to indicate one of the following situations: VoNR not supported, VoNR supported in NR connected to 5GCN only, VoNR supported in E-UTRAN connected to 5GCN only (e.g., when using legacy radio resources over the 5GCN), or VoNR supported in both NR connected to 5GCN and E-UTRAN connected to 5GCN. In some embodiments, UE 106 may use this information to reduce handover delay for WiFi calls, as discussed in detail below. Speaking generally, the information may specify whether a network supports voice communications using one or more RATs (e.g., NR, LTE, etc.) via a cellular system (e.g., the 5GCN or EPC).

Example Techniques for Reducing Handover Delay

The following discussion presents three example techniques for UE actions based on an indication that a 5G standalone (SA) network does not support VoNR.

Figure 9:
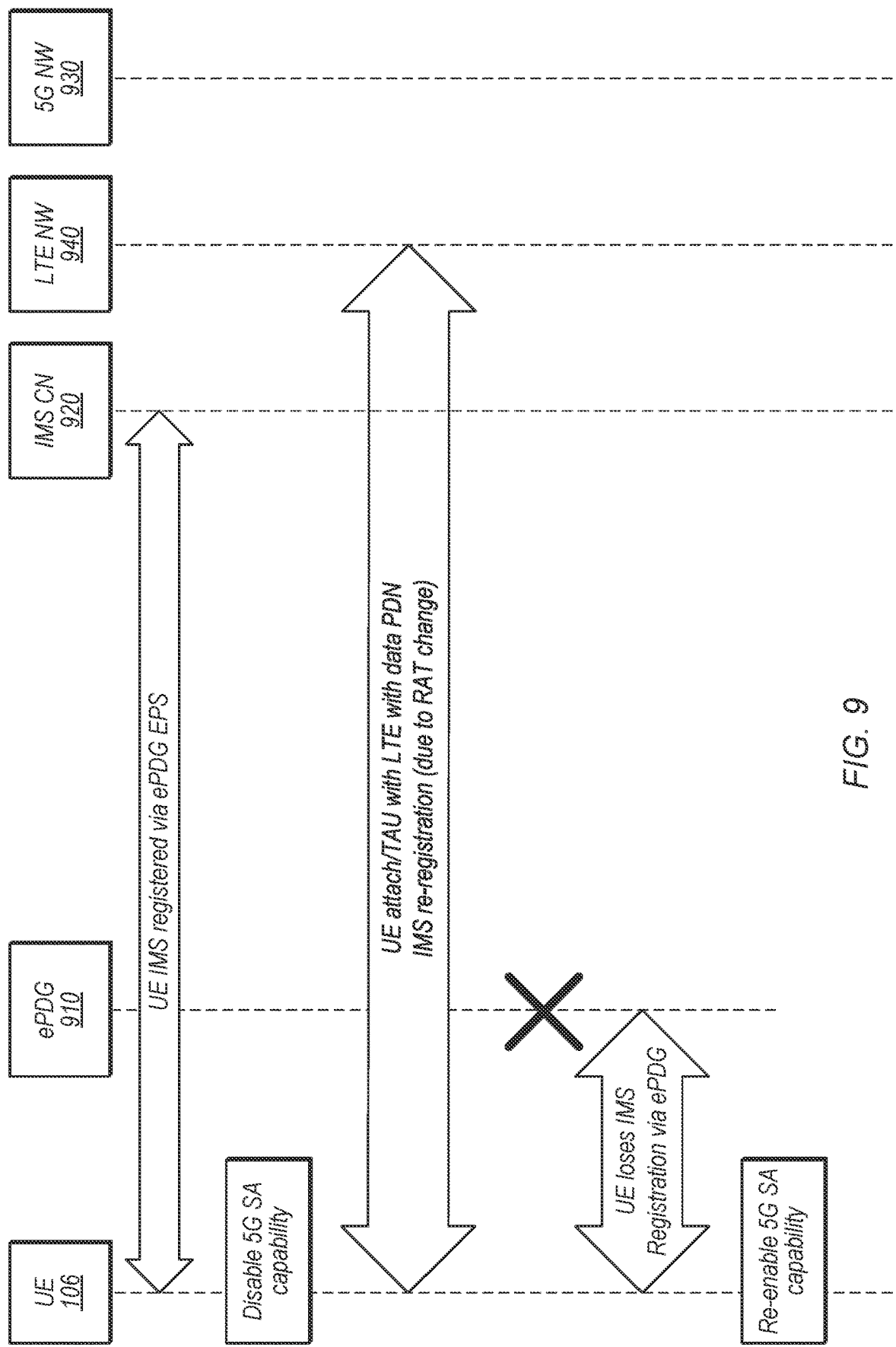
FIG. 9 is a communication diagram illustrating a first technique for disabling 5G capability, according to some embodiments.

FIG. 9 is a communication diagram illustrating a first technique for disabling 5G connectivity based on an indication that a 5G network does not support VoNR, according to some embodiments. In the illustrated example, the UE 106 disables 5G SA capability as soon as it is WiFi-calling registered (IMS registered to IMS CN 920 via the ePDG in this example). The UE then attaches to or performs TAU with an LTE network 940 and performs IMS re-registration (the UE may perform attachment or TAU based on interworking rules between 5GC and EPS, e.g., whether an N26 interface exists). When the WiFi connectivity of WiFi signal quality is poor (as shown by the "X"), UE 106 can handover directly to the LTE network 6940 rather than handing over the 5G network 930 first then falling back to the LTE network when the 5G network does not support VoNR. This may advantageously reduce delay in handing over the WiFi call to cellular.

As shown, UE 106 may re-enable 5G SA capability when it loses IMS registration via non-3GPP and the device is not in an active voice call on another cellular network. Further, in some embodiments, UE 106 may use a hysteresis timer to avoid frequent ping-ponging on and off the 5G network.

Figure 10:
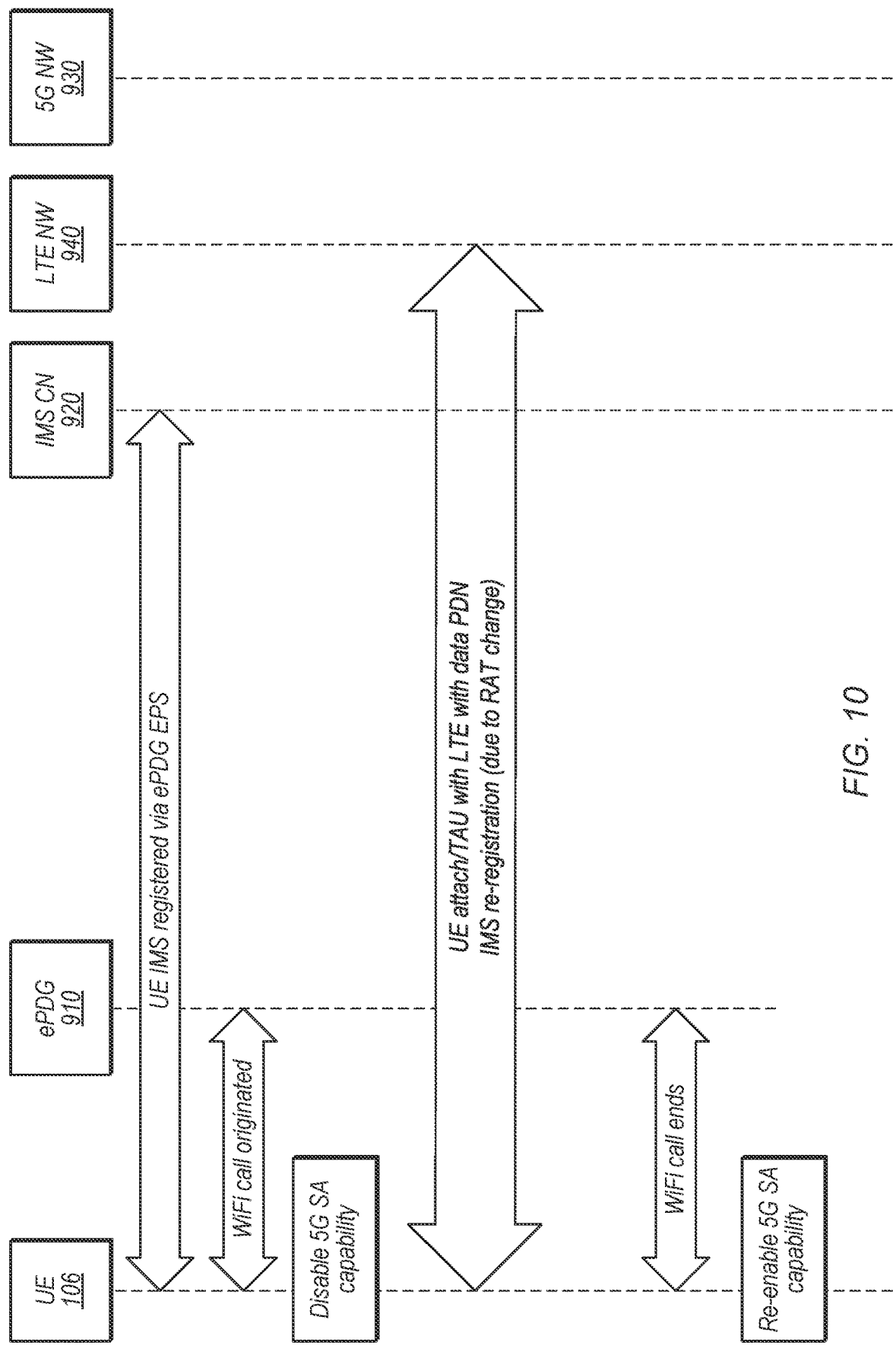
FIG. 10 is a communication diagram illustrating a second technique for disabling 5G capability, according to some embodiments.

FIG. 10 is a communication diagram illustrating a second technique for disabling 5G connectivity based on an indication that a 5G network does not support VoNR, according to some embodiments. In this example, the UE 106 disables 5G SA capability when a voice call is originated or received through a non-cellular network (e.g., WiFi) and re-enabled when the voice call ends. Therefore, as shown, the UE will camp on the LTE NW 940 instead and can quickly handover the call to the LTE network if needed.

Figure 11:
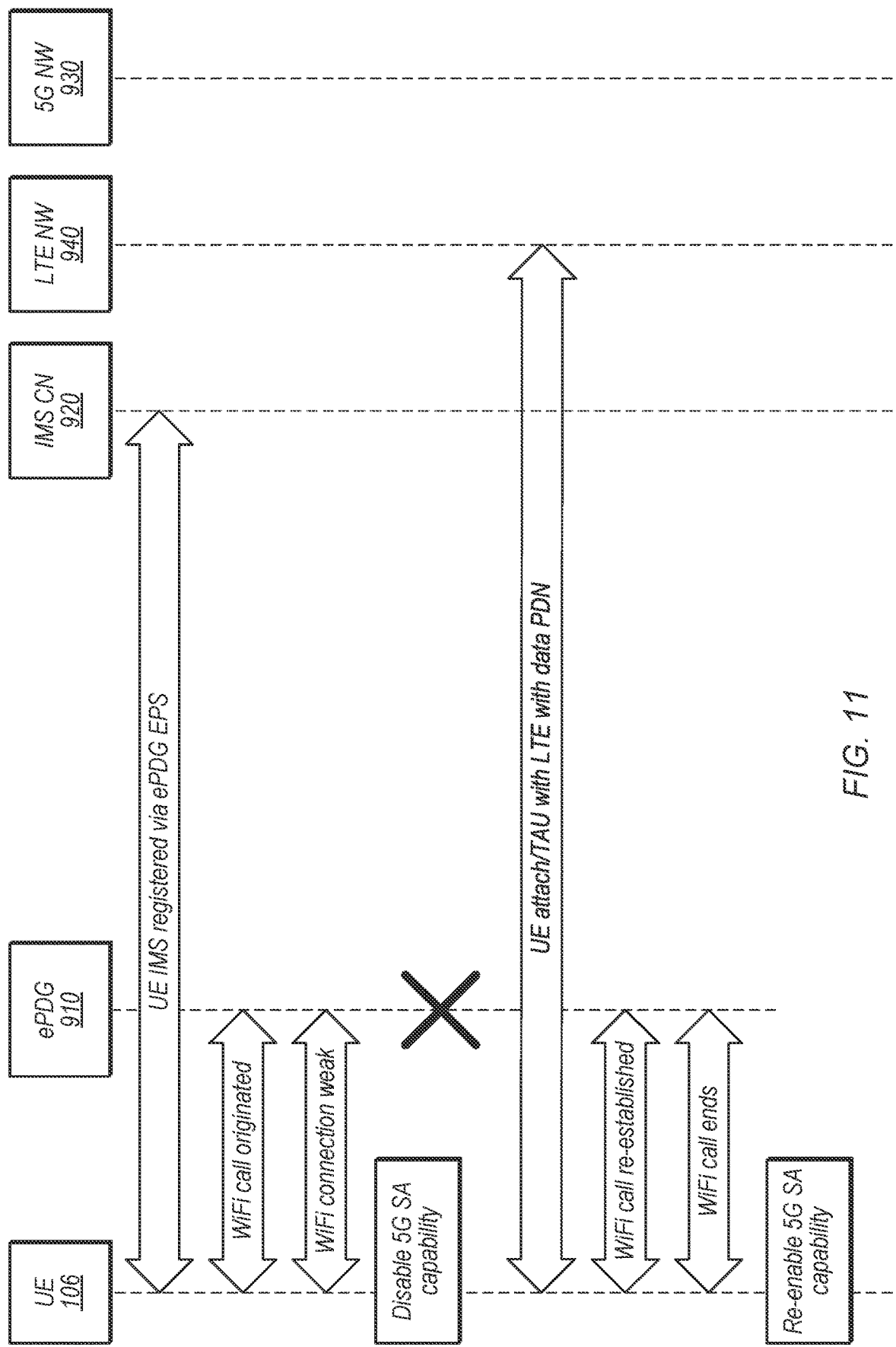
FIG. 11 is a communication diagram illustrating a third technique for disabling 5G capability, according to some embodiments.

FIG. 11 is a communication diagram illustrating a third technique for disabling 5G connectivity based on an indication that a 5G network does not support VoNR, according to some embodiments. In this example, the UE 106 disabled 5G SA capability in response to determining than an on-going WiFi-voice call suffers from a poor WiFi signal and is likely to be lost. UE 106 may consider various factors when making a determination that handover of the WiFi call is likely to be lost, such as signal strength data, packet loss data, historical data, etc. UE 106 re-enables 5G SA capability when the voice call ends in either RAT (via WiFi or the LTE network). Speaking generally, the technique of FIG. 9 is the most aggressive while the technique of FIG. 11 allows more fine-grained control of disabling 5G SA capability.

In some embodiments, alone or in combination with the various techniques discussed above, UE 106 may internally store information for different WLAN networks to which it has connected or conducted a voice call. This may allow UE 106 to determine the likelihood of a voice call handover for a particular WLAN network. For example, the UE 106 may maintain information indicating average LTE reference signal receive power (RSRP), real-time transport protocol (RTP) packet loss rate for voice calls on the WLAN network, the percentage of calls via the WLAN network that end in handover, etc. For the technique of FIG. 10, for example, the UE 106 may disable 5G SA capability when the WiFi call is originated only for WLAN networks whose past performance falls below one or more thresholds, which may allow the UE to stay connected to 5G when handover to cellular is unlikely, for example.

Further, in some embodiments, UE 106 may internally store information regarding the capabilities of 5G SA networks or portions or network elements thereof. For example, UE 106 may store information specifying networks' VoNR, EPS-fallback, or RAT-fallback capability based on previous voice call experience with those networks. Therefore, in addition to or in place of an explicit indication of VoNR capabilities, UE 106 may determine whether to disable 5G SA capability in various situations based on this stored fingerprint information. The UE 106 may clear or update this information periodically, e.g., to properly handle situations where a 5G network's VoNR capabilities change.

Note that the various techniques discussed above may also apply to WiFi emergency calls handed over to cellular and for N3IWF connections (e.g., instead of ePDG).

Further, the disclosed techniques may advantageously allow UE 106 to determine whether to stay on a 5G network or move to another RAT (e.g., a 2G or 3G RAT) when a user disables LTE, e.g., based on whether the 5G network supports VoNR. In particular UE 106 may remain on the 5G network if it supports VoNR or camp on another RAT if the 5G network uses EPS fallback.

Example Methods

Figure 12:
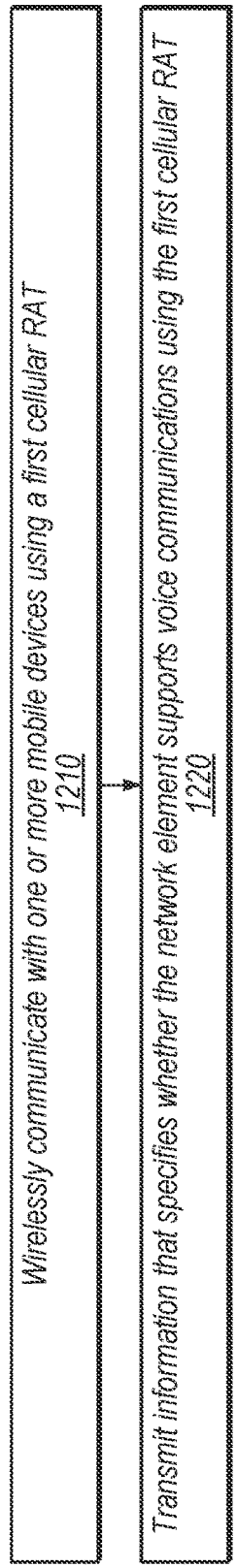
FIG. 12 is a flow diagram illustrating an example network-implemented method for specifying support of voice communications, according to some embodiments.

FIG. 12 is a flow diagram illustrating an example method for indicating whether a network element supports cellular voice communications, according to some embodiments. The method shown in FIG. 12 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1210, in the illustrated embodiment, a network element such as a gNB wirelessly communicates with one or more mobile devices using a first cellular RAT.

At 1220, in the illustrated embodiment, the network element transmits information that specifies whether the network element supports voice communications using the first cellular RAT. For example, an AMF may generating a message that specifies whether a gNB supports VoNR for a 5G SA network. The information may be included in a REGISTREATION ACCEPT message. The information may be encoded to indicate one of the following situations: the network element does not support voice over new radio (VoNR); the network element supports VoNR in NR connected to 5G core network (CN); the network element supports VoNR in E-UTRAN connected to 5GCN; or the network element supports VoNR in both NR connected to 5GCN and E-UTRAN connected to 5GCN.

Figure 13:
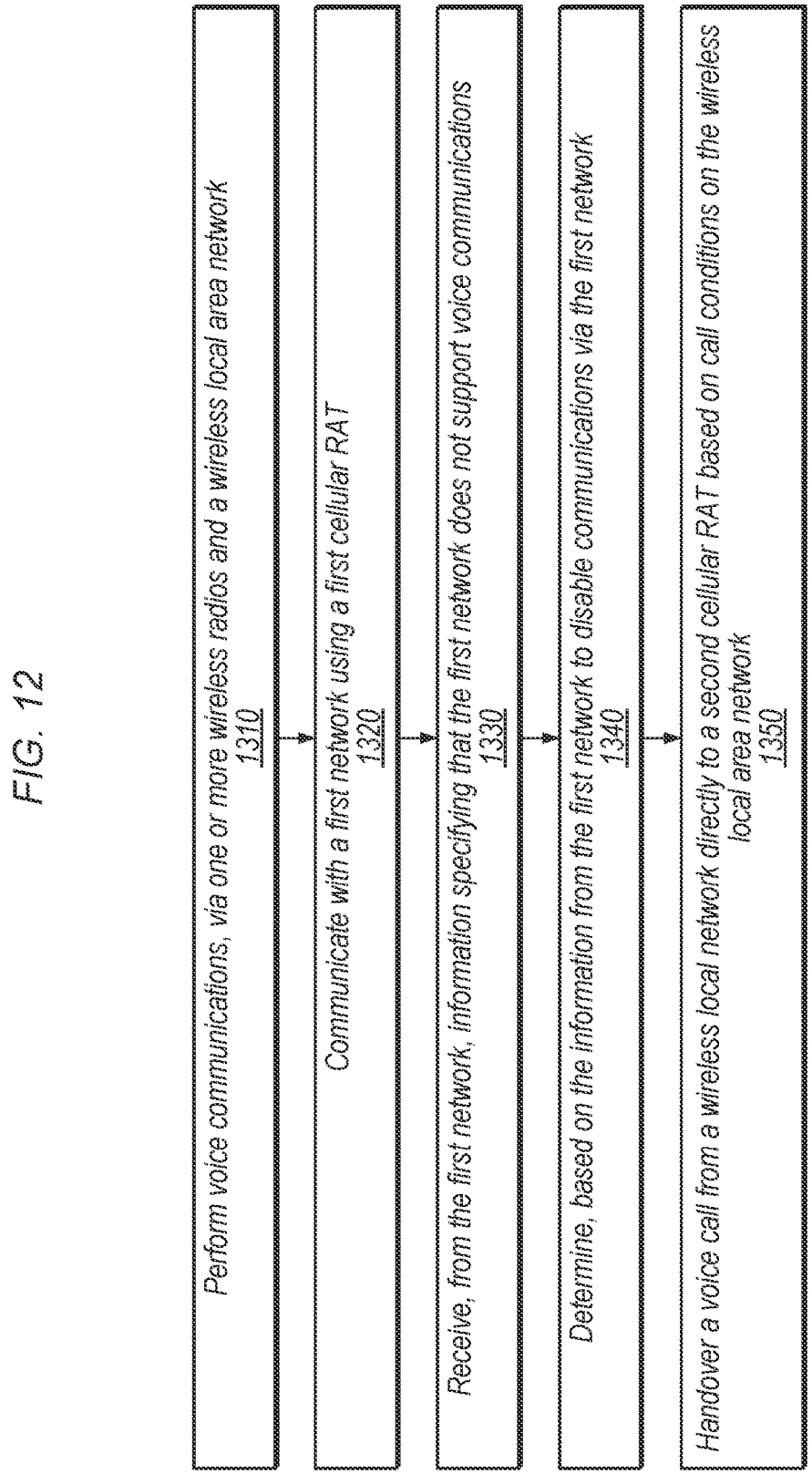
FIG. 13 is a flow diagram illustrating an example UE-implemented method for determining to disable communications via a cellular network, according to some embodiments.

FIG. 13 is a flow diagram illustrating an example method for determining whether to disable cellular network capabilities by a client device, according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, a mobile device performs voice communications, via one or more wireless radios and a wireless local area network. For example, the mobile device may initiate or receive a WiFi call.

At 1320, in the illustrated embodiment, the mobile device communicates, via one or more wireless radios, with a first network using a first cellular RAT.

At 1330, in the illustrated embodiment, the mobile devices receives, from the first network, information specifying that the first network does not support voice communications. In some embodiments, the information specifies whether the first network supports VoNR.

At 1340, in the illustrated embodiment, the mobile device determines, based on the information from the first network to disable communications via the first network. For example, the device may disable communications via the first network in response to being registered for voice calls via a wireless local area network. As another example, the device may disable communications via the first network in response to a voice call being initiated for the apparatus via a wireless local area network. As yet another example, the device may disable communications via the first network in response to connection conditions during a voice call via a wireless local area network meeting a threshold value.

In some embodiments, the device may store one or more communication metrics based on one or more prior voice calls via a first wireless local area network and disable communications via the first network, in response to a voice call being initiated for the apparatus via a wireless local area network, based on the one or more communication metrics. In some embodiments, the one or more communications metrics include one or more of: cellular signal strength when performing one or more voice calls via the first wireless local area network; packet loss rate when performing one or more voice calls via the first wireless local area network; or number of handovers of voice calls from the first wireless local area network to a cellular network At 1350, in the illustrated embodiment, the mobile devices hands over a voice call from a wireless local network directly to a second cellular RAT based on call conditions on the wireless local area network.

In some embodiments, first network is a NR network, the second network is an LTE network, and the voice call is a WiFi call.

Figure 14:
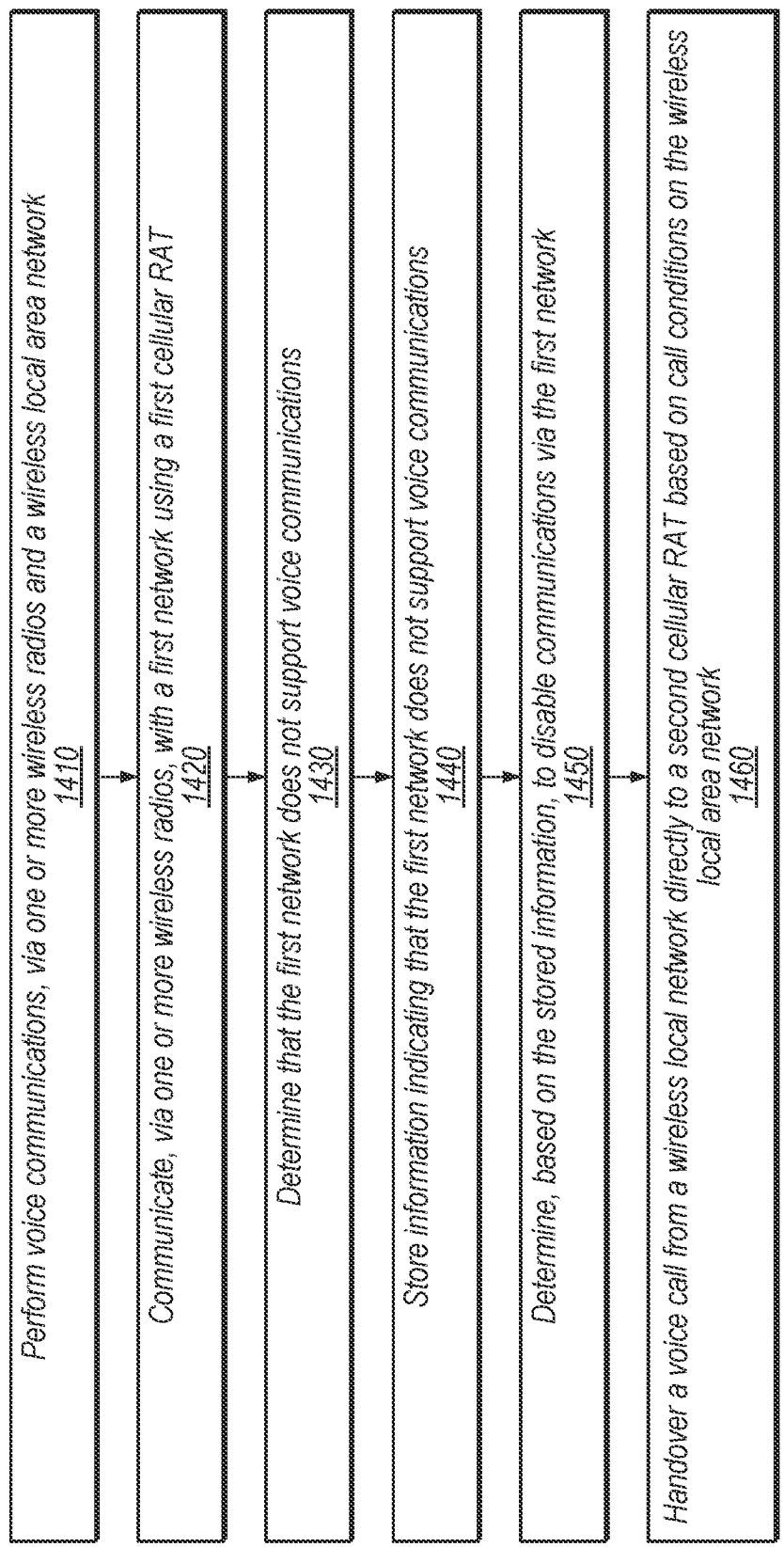
FIG. 14 is a flow diagram illustrating an example UE-implemented method for determining to disable communications via a cellular network based on internally stored information, according to some embodiments.

FIG. 14 is a flow diagram illustrating an example method for determining whether to disable cellular network capabilities by a client device, according to some embodiments. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1410, in the illustrated embodiment, a mobile device performs voice communications, via one or more wireless radios and a wireless local area network. For example, the mobile device may initiate or receive a WiFi call.

At 1420, in the illustrated embodiment, the mobile device communicates, via one or more wireless radios, with a first network using a first cellular RAT.

At 1430, in the illustrated embodiment, the mobile device determines that the first network does not support voice communications.

At 1440, in the illustrated embodiment, the mobile devices stores information indicating that the first network does not support voice communications.

At 1450, in the illustrated embodiment, the mobile device determines, based on the stored information, to disable communications via the first network.

At 1460, in the illustrated embodiment, the mobile devices hands over a voice call from a wireless local network directly to a second cellular RAT based on call conditions on the wireless local area network.

As used herein, the term "module" refers to circuitry configured to perform specified operations or to physical non-transitory computer readable media that store information (e.g., program instructions) that instructs other circuitry (e.g., a processor) to perform specified operations. Thus, modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 15:
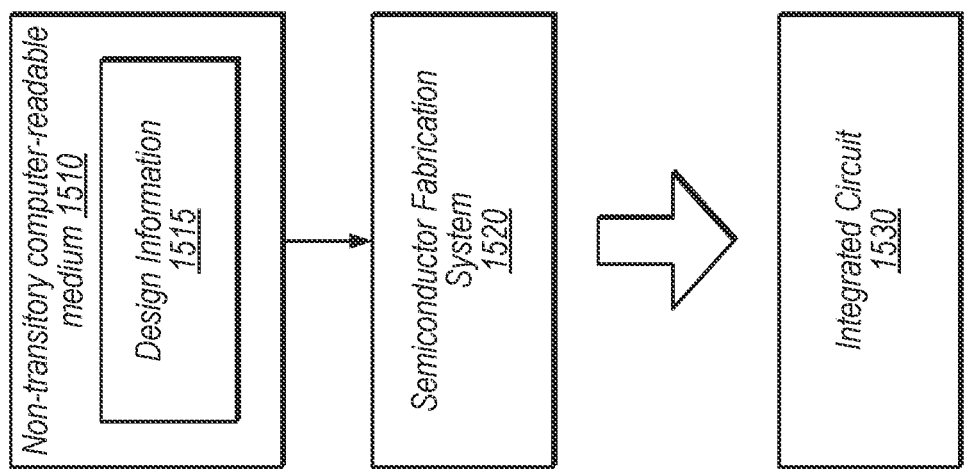
FIG. 15 is a block diagram illustrating an example computer-readable medium that stores design information for an integrated circuit, according to some embodiments.

FIG. 15 is a block diagram illustrating an example non-transitory computer-readable storage medium that stores circuit design information, according to some embodiments. In the illustrated embodiment semiconductor fabrication system 1520 is configured to process the design information 1515 stored on non-transitory computer-readable medium 1510 and fabricate integrated circuit 1530 based on the design information 1515.

Non-transitory computer-readable storage medium 1510, may comprise any of various appropriate types of memory devices or storage devices. Non-transitory computer-readable storage medium 1510 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1510 may include other types of non-transitory memory as well or combinations thereof. Non-transitory computer-readable storage medium 1510 may include two or more memory mediums which may reside in different locations, e.g., in different computer systems that are connected over a network.

Design information 1515 may be specified using any of various appropriate computer languages, including hardware description languages such as, without limitation: VHDL, Verilog, SystemC, SystemVerilog, RHDL, M, MyHDL, etc. Design information 1515 may be usable by semiconductor fabrication system 1520 to fabricate at least a portion of integrated circuit 1530. The format of design information 1515 may be recognized by at least one semiconductor fabrication system 1520. In some embodiments, design information 1515 may also include one or more cell libraries which specify the synthesis and/or layout of integrated circuit 1530. In some embodiments, the design information is specified in whole or in part in the form of a netlist that specifies cell library elements and their connectivity. Design information 1515, taken alone, may or may not include sufficient information for fabrication of a corresponding integrated circuit. For example, design information 1515 may specify the circuit elements to be fabricated but not their physical layout. In this case, design information 1515 may need to be combined with layout information to actually fabricate the specified circuitry.

Integrated circuit 1530 may, in various embodiments, include one or more custom macrocells, such as memories, analog or mixed-signal circuits, and the like. In such cases, design information 1515 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 is configured to operate according to a circuit design specified by design information 1515, which may include performing any of the functionality described herein. For example, integrated circuit 1530 may include any of various elements shown in FIGS. 3-7A. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Figure 16:
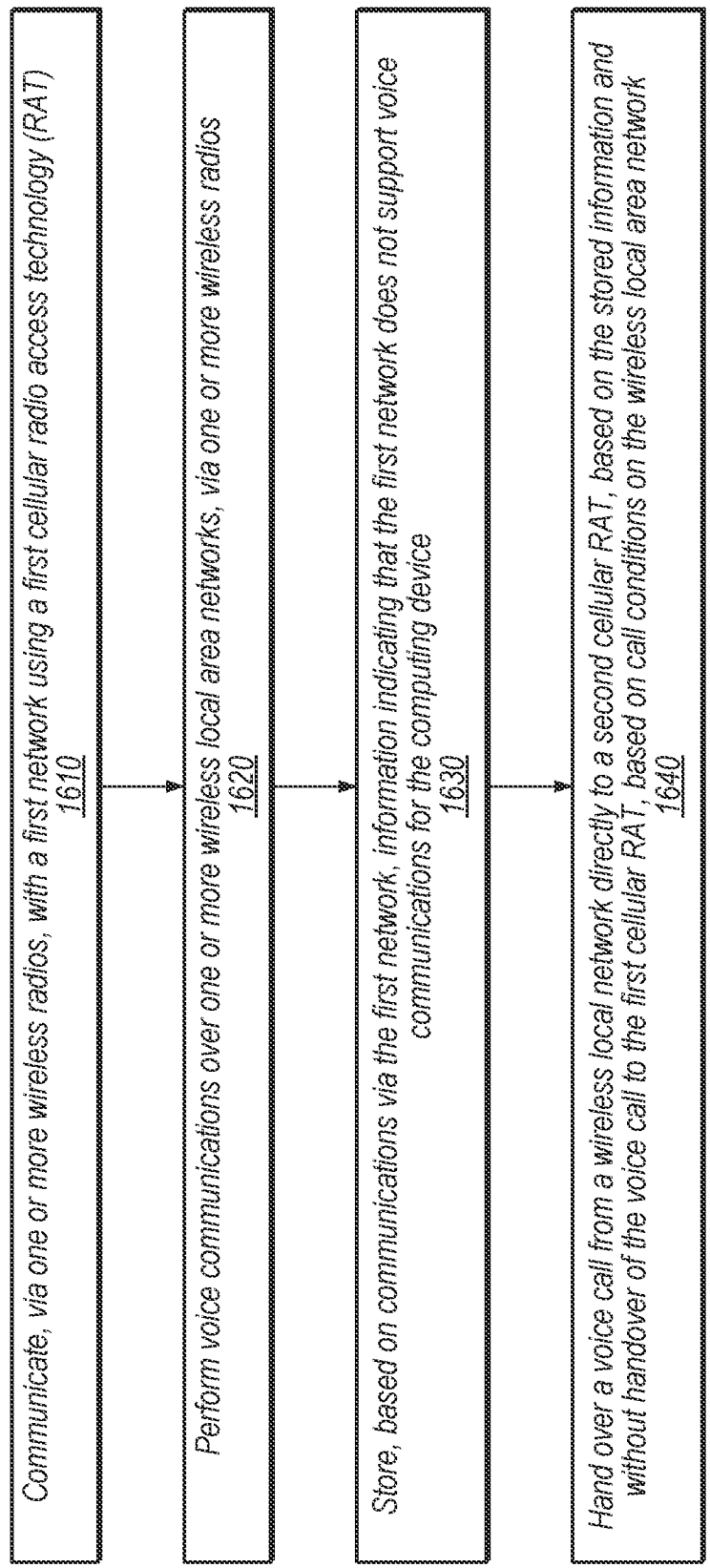
FIG. 16 is another flow diagram illustrating an example UE-implemented method for determining to disable communications via a cellular network based on internally stored information, according to some embodiments.

FIG. 16 is a flow diagram illustrating an example method for determining whether to disable cellular network capabilities by a client device, according to some embodiments. The method shown in FIG. 16 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1610, in the illustrated embodiment, a computing device communicates, via one or more wireless radios, with a first network using a first cellular radio access technology (RAT). For example, the first RAT is may be a new radio (NR) RAT and the device may also communicate via a second RAT such as an Evolved-UMTS Terrestrial Radio Access Network (E-UTRAN) RAT.

At 1620, in the illustrated embodiment, the device performs voice communications over one or more wireless local area networks, via one or more wireless radios.

At 1630, in the illustrated embodiment, the device stores, based on communications via the first network, information indicating that the first network does not support voice communications for the computing device. For example, the communications via the first network may include a previous fallback for a voice call from the first cellular RAT to the second cellular RAT after a handover from the wireless local area network, which may indicate to the device that the first network does not support voice communications for the computing device, e.g., in a current registration area. The stored information may indicate that the network supports voice communications via fallback to another RAT.

At 1640, in the illustrated embodiment, the device hands over a voice call from a wireless local network directly to a second cellular RAT, based on the stored information and without handover of the voice call to the first cellular RAT, based on call conditions on the wireless local area network. The second network may voice over new radio (VoNR) in E-UTRAN connected to a 5G core network (5GCN).

The device may initially be attached to the first network during the voice call over the WLAN. In some embodiments, the device determines, based on the stored information and a first event associated with wireless local area network, to disable communications via the first network and attach to the second network during the call. For example, the first event may be: the apparatus being registered for voice calls via the wireless local area network, a voice call being initiated or received for the apparatus via the wireless local area network, or connection conditions during a voice call via the wireless local area network meeting a threshold value (e.g., deteriorating). The device may perform IMS re-registration subsequent to attachment to the second network. The device may store one or more communication metrics based on one or more prior voice calls via the wireless local area network and the first event may be defined based on the one or more communication metrics. For example, if the device detects conditions that previously preceded a dropped call on the WLAN, the device may disable communications via the first cellular network and attach to the second cellular network.

In some embodiments, the device enables communications via the first network after a hysteresis interval subsequent to an end of the first event (e.g., the end of registration on the WLAN network for voice calls, a call ending, or connection conditions improving past the threshold value). In some embodiments, the voice communications over one or more wireless local area networks are non-3GPP interworking function (N3IWF) communications or evolved packet data gateway (ePDG) communications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
 performing, over a wireless local area network, an IP multimedia subsystem (IMS) registration via a non-3GPP interworking function (N3IWF) or evolved packet data gateway (ePDG);
 establishing connection over one or more of a first 3GPP network and a second 3GPP network;
 determining that the first 3GPP network:
  does not support voice communications for a device; or
  supports only fallback to the second 3GPP network for voice communications;
 originating or receiving a voice call via the N3IWF or ePDG;
 disabling a capability associated with the first 3GPP network based on one of:
  (a) IMS registration via the N3IWF or ePDG; or
  (b) originating or receiving a voice call via the N3IWF or ePDG;
 handing over the voice call from the wireless local area network directly to the second 3GPP network using a second 3GPP cellular radio access technology (RAT) in response to disabling the capability associated with the first 3GPP network; and
 enabling the capability associated with the first 3GPP network based on one of:
  (a) IMS deregistration via the N3IWF or ePDG; or
  (b) ending of the voice call.

2. The method of claim 1, wherein the voice call was initiated on the first 3GPP network and transferred to the wireless local area network.

3. The method of claim 1, wherein the first 3GPP network uses a new radio (NR) RAT.

4. The method of claim 1, wherein the second 3GPP cellular RAT is an Evolved-UMTS Terrestrial Radio Access Network (E-UTRAN) RAT.

5. The method of claim 4, wherein the second 3GPP network supports voice over new radio (VoNR) in E-UTRAN connected to a 5G core network (5GCN) or voice over LTE (VoLTE).

6. The method of claim 1, wherein said disabling the capability associated with the first 3GPP network is further based on one or more communications metrics via the wireless local area network falling below one or more threshold values.

7. The method of claim 1, further comprising performing IMS re-registration.

8. The method of claim 1, wherein said enabling the capability associated with the first 3GPP network is further based on an end of a hysteresis interval.

9. A method, comprising:
performing an IP multimedia subsystem (IMS) voice session over one or more wireless local area networks via a non-3GPP interworking function (N3IWF) or evolved packet data gateway (ePDG);
storing information indicating that a first network using a first 3GPP cellular radio access technology (RAT) does not support voice communications for a user equipment (UE); and
handing over the IMS voice session from the one or more wireless local area networks directly to a second network using a second 3GPP cellular RAT, based on the stored information and without handover of the IMS voice session to the first 3GPP cellular RAT.

10. The method of claim 9, wherein the stored information is further based on communications via the first network that include a previous fallback for a voice call from the first 3GPP cellular RAT to the second 3GPP cellular RAT after a handover from the one or more wireless local area networks.

11. The method of claim 9, wherein the IMS voice session was initiated on the first network and transferred to the one or more wireless local area networks.

12. The method of claim 9, wherein the first 3GPP cellular RAT is a new radio (NR) RAT and the second 3GPP cellular RAT is an Evolved-UNITS Terrestrial Radio Access Network (E-UTRAN) RAT.

13. The method of claim 12, wherein second network supports voice over new radio (VoNR) in E-UTRAN connected to a 5G core network (5GCN) or voice over LTE (VoLTE).

14. The method of claim 9, wherein the stored information indicates that the first network supports voice communications via fallback to another RAT.

15. The method of claim 9, further comprising:
determining, based on the stored information and a first event associated with a wireless local area network, to disable communications via the first network and attach to the second network during the IMS voice session.

16. The method of claim 15, wherein the first event is the UE being registered for voice calls via the wireless local area network.

17. The method of claim 15, wherein the first event is a voice call being initiated or received for the UE via the wireless local area network.

18. The method of claim 15, wherein the first event is one or more communications metrics of the wireless local area network falling below one or more threshold values.

19. An apparatus, comprising:
a processor configured to cause a user equipment (UE) to:
perform, over a wireless local area network, an IP multimedia subsystem (IMS) registration via a non-3GPP interworking function (N3IWF) or evolved packet data gateway (ePDG);
establish connection over one or more of a first 3GPP network and a second 3GPP network;
determine that the first 3GPP network:
does not support voice communications for the apparatus; or
supports only fallback to the second 3GPP network for voice communications;
originate or receiving a voice call via the N3IWF or ePDG;
disable a capability associated with the first 3GPP network based on one of:
(a) IMS registration via the N3IWF or ePDG; or
(b) originating or receiving a voice call via the N3IWF or ePDG;
handover the voice call from the wireless local area network directly to the second 3GPP network using a second 3GPP cellular radio access technology (RAT) in response to disabling the capability associated with the first 3GPP network; and
enable the capability associated with the first 3GPP network based on one of:
(a) IMS deregistration via the N3IWF or ePDG; or
(b) ending of the voice call.

20. The apparatus of claim 19, further comprising:
a radio operably coupled to the processor.

21. A processor comprising circuitry configured to perform operations comprising:
performing an IP multimedia subsystem (IMS) voice session over one or more wireless local area networks via a non-3GPP interworking function (N3IWF) or evolved packet data gateway (ePDG);
storing information indicating that a first network using a first 3GPP cellular radio access technology (RAT) does not support voice communications for a user equipment (UE); and
handing over the IMS voice session from the one or more wireless local area networks directly to a second network using a second 3GPP cellular RAT, based on the stored information and without handover of the IMS voice session to the first 3GPP cellular RAT.

22. The processor of claim 21, wherein the stored information is further based on communications via the first network that include a previous fallback for a voice call from the first 3GPP cellular RAT to the second 3GPP cellular RAT after a handover from the one or more wireless local area networks.

23. The processor of claim 21, wherein the IMS voice session was initiated on the first network and transferred to the one or more wireless local area networks.

24. The processor of claim 21, wherein the first 3GPP cellular RAT is a new radio (NR) RAT and the second 3GPP cellular RAT is an Evolved-UMTS Terrestrial Radio Access Network (E-UTRAN) RAT.

25. The processor of claim 21, wherein the stored information indicates that the first network supports voice communications via fallback to another RAT.

26. The processor of claim 21, the operations further comprising:
determining, based on the stored information and a first event associated with a wireless local area network, to disable communications via the first network and attach to the second network during the IMS voice session.

* * * * *

UNITED STATES PATENT AND TRADEMARK OFFICE
CERTIFICATE OF CORRECTION

| | |
|---|---|
| PATENT NO. | : 11,963,060 B2 |
| APPLICATION NO. | : 17/959957 |
| DATED | : April 16, 2024 |
| INVENTOR(S) | : Yifan Zhu et al. |

It is certified that error appears in the above-identified patent and that said Letters Patent is hereby corrected as shown below:

In the Claims

Column 21, Line 39, delete "UNITS" and substitute --UMITS--

Signed and Sealed this
Thirtieth Day of July, 2024

Katherine Kelly Vidal
*Director of the United States Patent and Trademark Office*